(12) United States Patent
    Balanica

(10) Patent No.: US 9,331,982 B2
(45) Date of Patent: May 3, 2016

(54) SYSTEM AND METHOD FOR FILTERING RECEIVED DATA UNITS

(75) Inventor: Marius-Aurel Balanica, Bucharest (RO)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 1070 days.

(21) Appl. No.: 13/392,977

(22) PCT Filed: Sep. 30, 2009

(86) PCT No.: PCT/IB2009/054283
    § 371 (c)(1),
    (2), (4) Date: Feb. 28, 2012

(87) PCT Pub. No.: WO2011/039569
    PCT Pub. Date: Apr. 7, 2011

(65) Prior Publication Data
    US 2012/0179892 A1    Jul. 12, 2012

(51) Int. Cl.
    *G06F 12/00*     (2006.01)
    *H04L 29/06*     (2006.01)
    *H04L 12/935*    (2013.01)
    *H04L 12/933*    (2013.01)

(52) U.S. Cl.
    CPC .......... *H04L 63/0263* (2013.01); *H04L 49/109* (2013.01); *H04L 49/3009* (2013.01)

(58) Field of Classification Search
    CPC .............. H04L 63/0263; H04L 49/109; H04L 49/3009
    USPC ........................................................ 711/108
    See application file for complete search history.

(56) References Cited

U.S. PATENT DOCUMENTS

| | | | |
|---|---|---|---|
| 5,473,607 A | 12/1995 | Hausman et al. | |
| 5,748,905 A | 5/1998 | Hauser et al. | |
| 5,951,651 A | 9/1999 | Lakshman et al. | |
| 6,147,976 A | 11/2000 | Shand et al. | |
| 7,313,667 B1 | 12/2007 | Pullela et al. | |
| 2002/0023089 A1* | 2/2002 | Woo .............................. | 707/101 |
| 2003/0002438 A1* | 1/2003 | Yazaki et al. ................ | 370/229 |
| 2003/0108043 A1 | 6/2003 | Liao | |
| 2005/0122966 A1* | 6/2005 | Bowes .......................... | 370/360 |
| 2006/0221967 A1 | 10/2006 | Narayan et al. | |
| 2009/0190597 A1* | 7/2009 | Kung et al. .............. | 370/395.32 |
| 2010/0031021 A1* | 2/2010 | Arnold et al. ................. | 713/155 |

OTHER PUBLICATIONS

International Search Report and Written Opinion correlating to PCT/IB2009/054283 dated May 28, 2010.

\* cited by examiner

*Primary Examiner* — Charles Rones
*Assistant Examiner* — Nanci Wong

(57) ABSTRACT

A system for filtering received data units comprises a memory structure adapted to store a plurality of P tables, each table comprising a plurality of filter-keys and corresponding indices, each filter-key comprising one or more key-bits each corresponding to a filter configurable by a corresponding filter configuration value; and at least one processing element connected to the memory structure and comprising a digesting module adapted to generate the one or more key-bits of each of the filter-keys of the tables by splitting the corresponding filter configuration value into P configuration-pieces each having a number of bits, and to use each configuration-piece as a first index for setting a corresponding key-bit in the corresponding table; and a filtering module adapted to receive and split the data units into P data-pieces each having the number of bits, for each data-piece use the data-piece as a second index for reading the corresponding filter-key from the corresponding table, and generate a pass-indication key from a bitwise logical conjunction between the read filter-keys.

20 Claims, 11 Drawing Sheets

| 64 | | | 66 | |
|---|---|---|---|---|
| 0xDD | 0 | | 0xA4 | 0 |
| 0xDE | 0 | | 0xA5 | 0 |
| 0xDF | 1 | | 0xA6 | 1 |
| 0xE0 | 0 | | 0xA7 | 0 |
| 0xE1 | 0 | | 0xA8 | 0 |

| 68 | | | 70 | |
|---|---|---|---|---|
| 0xDD | 0 | | 0xA4 | 0 |
| 0xDE | 0 | | 0xA5 | 0 |
| 0xDF | 1 | | 0xA6 | 1 |
| 0xE0 | 1 | | 0xA7 | 0 |
| 0xE1 | 0 | | 0xA8 | 0 |

SYSTEM AND METHOD FOR FILTERING RECEIVED DATA UNITS

FIELD OF THE INVENTION

This invention in general relates to data filtering and more specifically to a system and a method for filtering received data units and a computer program product.

BACKGROUND OF THE INVENTION

Filtering huge amounts of data in a short time is often required for example when filtering data streams used in computer networking devices such as routers, network switches or firewalls. For example, when a network switch receives a data frame at one of its ports, the data filtering routine may include that the network switch updates an internal table with the source address of the frame and the port it was received on, looks up the destination address in the table to determine what port the frame needs to be forwarded to, and sends it out on that port.

This example of a high speed searching application may be implemented using dedicated hardware-accelerated devices such as content-addressable memories (CAM) instead of common memory devices such as for example random access memory devices and for example general purpose processors. Unlike for example random access memory devices where a user supplies a memory address and the memory returns a data word stored at the supplied address, a CAM only receives the data word. The CAM then searches its content and if the data word is found, the CAM returns one or more addresses where the data word was found. A ternary CAM may allow matching states "1", "0" and a third matching state of "X" or "Care/Don't Care" for one or more bits in the stored data word. This feature can be implemented by for example providing each individual memory bit in a CAM with a dedicated comparison circuit to detect a match between the stored bit and the input bit and combining their match outputs to yield a complete data word match. This circuitry increases the physical size of the CAM chip and therefore device costs and power consumption.

SUMMARY OF THE INVENTION

The present invention provides a system and a method for filtering received data units and a computer program product as described in the accompanying claims.

Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

FIG. 5 schematically shows an example of tables containing filter-keys with and without additional super-filter key.

DETAILED DESCRIPTION OF THE PREFERRED EMBODIMENTS

In a sample use case there may be a device that has an incoming flow of data words which need filtering. The data which may not pass the filtering process should be ignored while the rest be kept in memory or sent to an output for further processing. More practically it can be viewed as being part of a filtering system such as for example a network packet filtering or classification system, for example providing a rule where "pass" or "fail" indications point to an action set. Instead of implementing the filtering using hardware accelerators such as ternary CAMs, which are expensive devices, the shown system may be implemented using other memory structures and processing elements.

Figure 1:
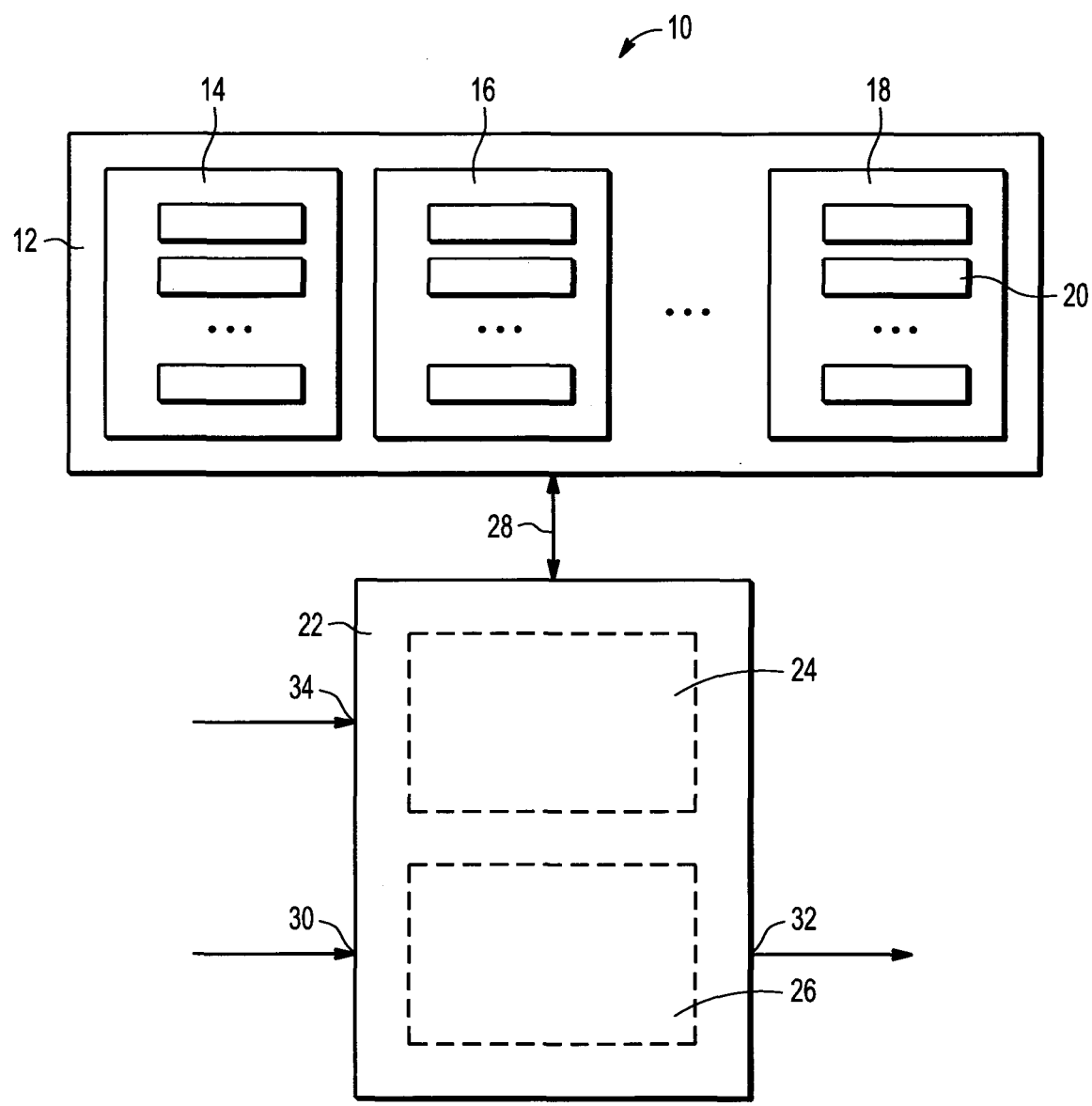
FIG. 1 shows a schematic block diagram of example of an embodiment of a system for filtering received data units.

Referring to FIG. 1, a schematic block diagram of an example of an embodiment of a system for filtering received data units is shown. The system 10 for filtering received data units may comprise a memory structure 12 adapted to store a plurality of P tables 14, 16, 18, each table comprising a plurality of filter-keys 20 and corresponding indices, each filter-key 20 comprising one or more key-bits each corresponding to a filter configurable by a corresponding filter configuration value. And the system 10 may comprise at least one processing element 22 connected to the memory structure 12 and comprising a digesting module 24 adapted to generate the one or more key-bits of each of the filter-keys 20 of the tables 14, 16, 18 by splitting the corresponding filter configuration value into P configuration-pieces each having a number of bits, and to use each configuration-piece as a first index for setting a corresponding key-bit in the corresponding table; and a filtering module 26 adapted to receive and split the data units into P data-pieces each having the number of bits, for each data-piece use the data-piece as a second index for reading the corresponding filter-key from the corresponding table, and generate a pass-indication key from a bitwise logical conjunction between the read filter-keys.

The at least one processing element 22 may be connected via an interface 28 to the memory structure 12 allowing for example reading and writing information to and from the memory structure 12. The memory structure may not be a hash table and information can be retrieved.

The processing element 22 may have a data input 30 for receiving the incoming data units and a data output 32 for providing for example data units which passed the filtering process or meta-information such as a "passed" indication indicating a filtering result for a received data unit.

And the system may for example comprise a configuration input 34 for receiving filter-configuration values. However, implementations may differ. For example, configuration input 34 and data input 30 may be the same input.

A data unit may be a signal carrying information which can be represented in a binary representation as a sequence of binary digits (bits). It may for example be a data word of 32 bits size. However, the data word size may be 16 or 64 bits or any other size such as for example 8, 9, 12, 18, 24, 36, 39, 40, 48, or 60 bits.

The memory structure may comprise one or more memory devices such as random access memory (RAM) devices, for example dynamic RAM (DRAM). However, it may comprise other memory devices based on other technologies and it may for example comprise separate memories and registers for holding the data-pieces and configuration-pieces, the filter-keys read by the filtering module or for holding the pass-indication key. A table may be a memory block within the memory structure having the respective filter-keys and indices identifying the keys.

Setting a key-bit in a table may refer to changing the value of a key-bit in a table from logical level "0" to "1". Non-set bits may have logical level "0". However, logical levels and their meaning may be chosen differently in other example implementations of the system. The representation of the two binary states may therefore for example be inverse.

A configuration-piece may be a bit sequence generated from splitting a filter configuration value, wherein a bit sequence created by concatenating all P configuration-pieces may be the restored filter configuration value. Likewise, a data-piece may be generated by splitting a received data unit and a bit sequence created by concatenating all P data-pieces may be the restored data unit.

It should be noted that the number P, which may be a positive number of at least 2, may describe the amount of tables for filter-keys, configuration-pieces, and data-pieces.

A filter may pass a received data unit when a value of the data unit matches the filter's configuration value.

A filter-key may be a bit sequence of key-bits, the bit sequence having a size of the number of filters used. Each key-bit set to "1" may identify a filter configuration value having a configuration-piece having a value which, taken as an index for the corresponding table, may identify the filter-key the particular key-bit belongs to in the table corresponding to the configuration-piece.

A filter-key 20 may comprise one or more key-bits. It may comprise as many key-bits as filters. A key bit may be either of logical level "1" or "0". The filter-keys may encode filter information in a plurality of P tables for a single filter. Loading filtering keys from memory at a certain index is the way filtering is performed. The passing/not passing information is immediately known for that particular piece.

A table may for example explicitly comprise index values. However, the term comprising indices may also refer to tables wherein an index can be derived from information implicitly contained in the table, for example by counting table entries.

A logical conjunction may be a logic AND operation implemented for example using an AND gate or a processing device adapted to perform the logical conjunction between values.

A processing element may be any circuitry adapted to perform the digesting, i.e. the splitting of filter configuration values and filling the filter-key tables, and the filtering of received data units using the digested filter configuration values. This functionality may be implemented in a single element or distributed between a plurality of processing elements. A processing elements may for example be a dedicated or general purpose single-core or multi-core processor or microcontroller unit, any other circuit configured to process data, for example a field programmable gate array. A digesting module and a filtering module may for example be dedicated sub-circuits of the processing element. However, the term may also refer to a set of instructions for enabling a processing element to perform the described functionality.

Constructing and addressing filtering information is achieved by way of a memory structure where all necessary information is available in both ways.

The digesting (or filter key generation and storing) module may be implemented as a single module or as a set of, for example P, modules, for example each configured to perform digesting for only one of the tables, therefore allowing for parallelization of configuration-piece processing. Likewise, the filtering module may be implemented as a single module or as a set of, for example P, modules.

The pass indication key may be a bit sequence adapted to indicate which of the filters used has successfully passed the processed data unit. It may for example have the same size as a filter key with each digit corresponding to one of the filters used. A logic "1" may indicate that the corresponding filter let pass the data unit, whereas a "0" may indicate that the received data unit did not pass that particular filter. Therefore, an evaluation, whether or not the data unit passed at least one of the filters may be determined by checking, if the pass indication key contains a non-zero value. All information about a data word passing or not may be available as positions of filters.

In an embodiment of the system, at least one of the filters may be a ternary filter configurable using the corresponding filter configuration value and a mask adapted to mask selected bits of the filter configuration value. The mask bits may serve as "X" or "care/don't care" bits, effectively implementing a third state. A masked bit sequence of for example "11XX1" may therefore match any of the four sequences "11001", "11011", "11101", or "11111".

For this embodiment, the digesting module may be adapted to use each allowed bit combination for the masked filter configuration value when generating the configuration-pieces and using them as a first index for setting a corresponding key-bit in the corresponding table. Hence, a ternary filter may allow for effective implementation of matching more than one key-bit.

Figure 2:
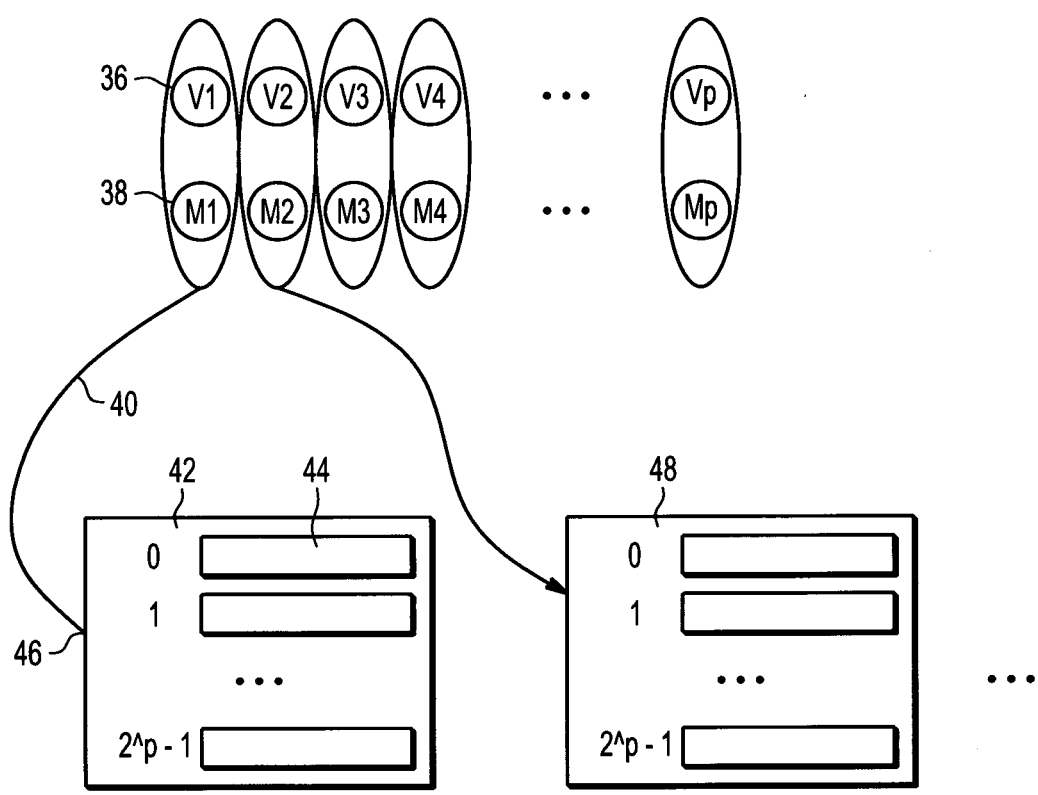
FIG. 2 schematically shows a diagram of an example of a table creation.

Referring to FIG. 2, a schematic diagram of an example of a table creation is shown. For a filter f, a filter configuration value and associated mask is split into a sequence of P configuration pieces $V_1$ to $V_P$ 36 and mask-pieces $M_1$ to $M_P$ 38. The digesting module may for example select all indexes that as numbers satisfy the ($V_1$, $M_1$) masked configuration value 40 and in the memory block holding the table 42 with the filter-keys 44 for the first piece and set 46 key-bit f at all selected indexes. Likewise, the shown second memory block may hold a table 48 for the filter-keys for the the second piece. As shown, filter-key indexes may for example run from 0 to $2^P-1$. This may apply for p=B/P, wherein B is the number of bits of a filter configuration value and P is the number of configuration-pieces, when the bit sizes of the P configuration-pieces are chosen equal. However, it should be noted it is within the scope of the presented system that the number of bits per piece may be chosen differently for different pieces.

Figure 3:
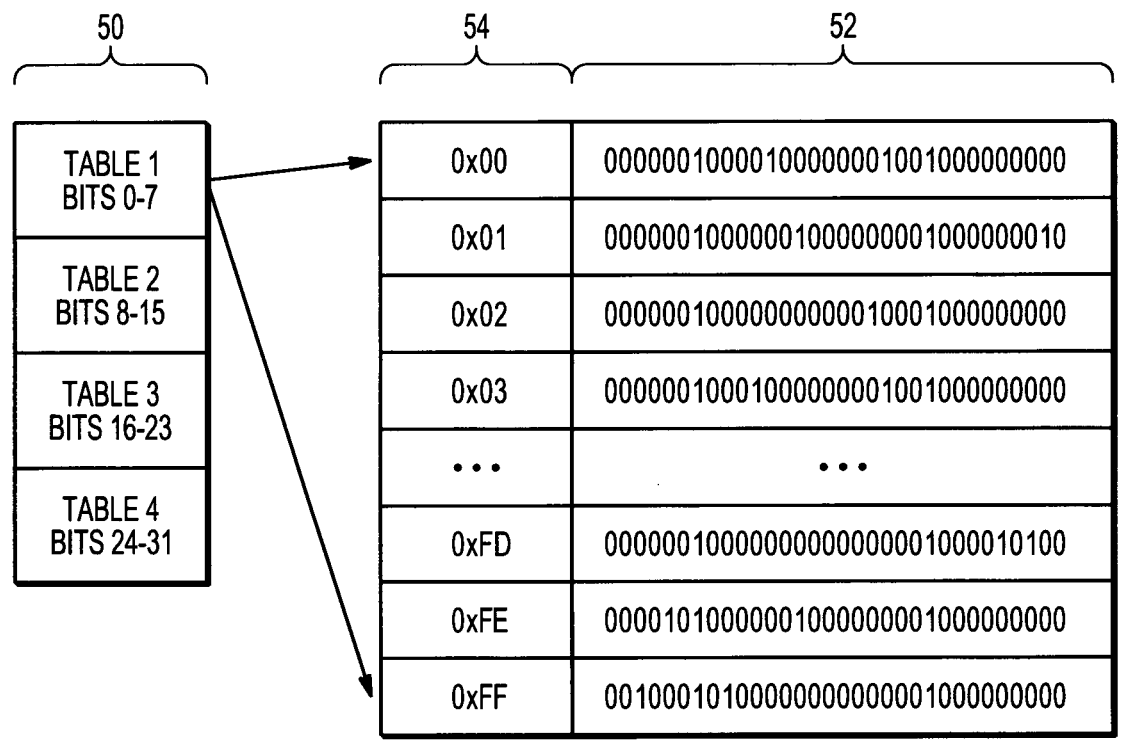
FIG. 3 schematically shows a diagram of an example of a part of a memory structure containing tables.

Referring to FIG. 3, a diagram of an example of a part of a memory structure containing tables is shown. In the shown example, a size of a data unit and of a filter configuration may be chosen SD=32 bits and there may be N=32 filters. The filter configuration value may be split into equal sized P=4 configuration-pieces of size Sd=8 in bits (P*Sd=SD). For each configuration-piece there may be an indexing table 50 of 2^Sd elements 52 each of size N bits, one bit for one filter. Therefore, the index 54 may run for example from 0 to 2^Sd−1. Each of the elements may be a filter-key. So table size may be given by (2^Sd)*N bits and total structure size may be given by P*(2^Sd)*N bits. For example, with Sd=8 there are P=32/8=4 tables of 8192 bits each and the structure may store 32768 bits=4 kiloBytes.

Figure 4:
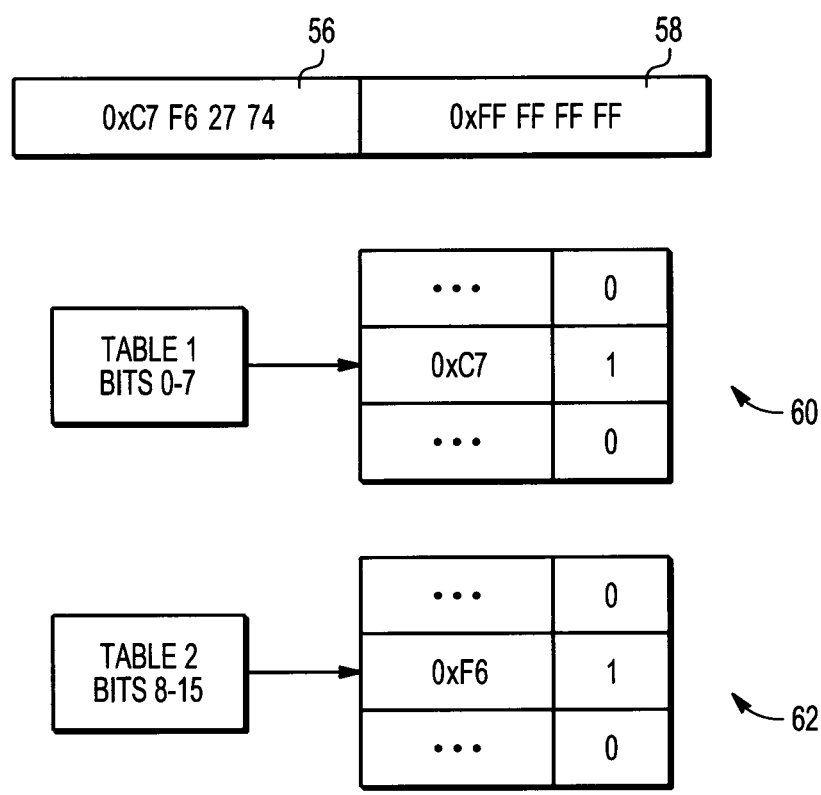
FIG. 4 schematically shows an example of tables containing filter-keys for one filter.

Referring now to FIG. 4, a schematic diagram of an example of tables containing filter-keys for one filter f is shown. A way of viewing filter-keys is to take the first data unit 56 piece with the mask 58 and ask the filtering question on each of its possible values and set a "1" bit on position f if filter f passes the particular value or "0" otherwise. In the example given in FIG. 4 the mask is always true and therefore the answer is simple: the only possible value is the piece of the filter configuration value (0xC7). The mechanism may be repeated for all filters and all pieces and may fill the whole structure. In the shown example there is one filter f and the data unit is 0x0AF6342E. This filter will not pass 60 the first byte because it has a "0" bit on position 0 in the key at the 0x0A index of the first table. It will pass 62 the second byte 0xF6 because it has a 1 on position 0 in the filtering key at the 0xF6 index in the second table. The other 2 tables will have to be checked so that f has "1" bits on the 0x34 and 0x2E positions.

Unless all pieces, which may for example be bytes, are passed by at least one filter, the data may be considered not passed. Filters can be setup with a mask containing "0" bits, i.e. "I-don't-care" bits in which case they will pass more bytes (pieces) in one table. If for one byte the value equals 0xC0 and the mask equals 0xF0 the following bytes may be passed: {0xC0, 0xC1, 0xC2, . . . , 0xCF}.

Referring to FIG. 5, an example of tables containing filter-keys with and without additional super-filter key is shown. In an embodiment of the system, the digesting module may be adapted to set one or more super-filter key-bits depending on a corresponding super-filter configuration value in addition to the key-bits depending on the filter configuration value for the same filter.

Since the shown system may work with filter-keys that specify which filter passes a currently processed data-piece, new passing values may be added in addition to the ones added due to the "0" bits in the filter mask. This is the super-filter option. In the shown example, a first filter is defined as mask 0xFFFFFFFF and filter configuration value 0xDFA60103. Without additional super-filter, the first 64 and second table 66 may comprise a "1" key-bit at index 0xDF and 0xA6, respectively. Adding a super-filter may be adding discrete values (not ranges created by X Don't-care bits). For example, an additional second filter given by mask 0xFFFFFFFF and filter configuration value 0xE0A70103 may be added to the first filter. This may be achieved by inserting the required byte (number of pieces=4, data word size=32 bits) without any need for another filter. As shown, in the given example the first table 68 may contain an additional "1" at index 0xE0, whereas the second table 70 may remain unchanged.

Figure 6:
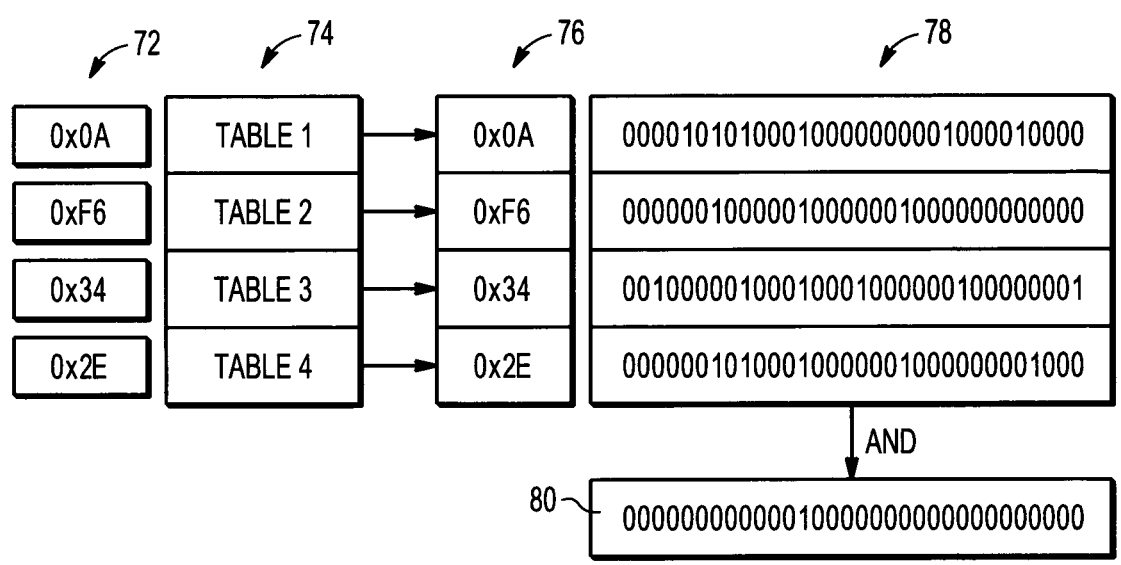
FIG. 6 schematically shows an example of filtering a data unit using an embodiment of a system for filtering received data units.

Referring to FIG. 6, an example of filtering a data unit using an embodiment of a system for filtering the received data units is shown.

The filtering module of the system may pass the data unit if at least one filter passes all of the data-pieces. The filtering module may load the filtering keys 78 from the tables 74 at the indexes 76 given by the data-pieces 72, therefore a number of P keys may be loaded. Then the filtering module may perform an AND operation between all loaded filter-keys.

The system may pass the received data unit when the pass-indication key 80 comprises at least one set bit. If the result or pass-indication key 80 is not zero there may be at least one filter which passes all data-pieces and therefore the complete data unit passes. Each set bit may indicate which particular filter has passed the data unit. This information may then be used for taking more complex actions, depending on the particular application which comprises the filtering system.

In case the masks have "0" bits, i.e. "Don't care" bits, more data-pieces may successfully pass the filtering module. Multiple possibilities that pass in one data-piece will fully "combine" with all others of other pieces within the same filter.

Figure 7:
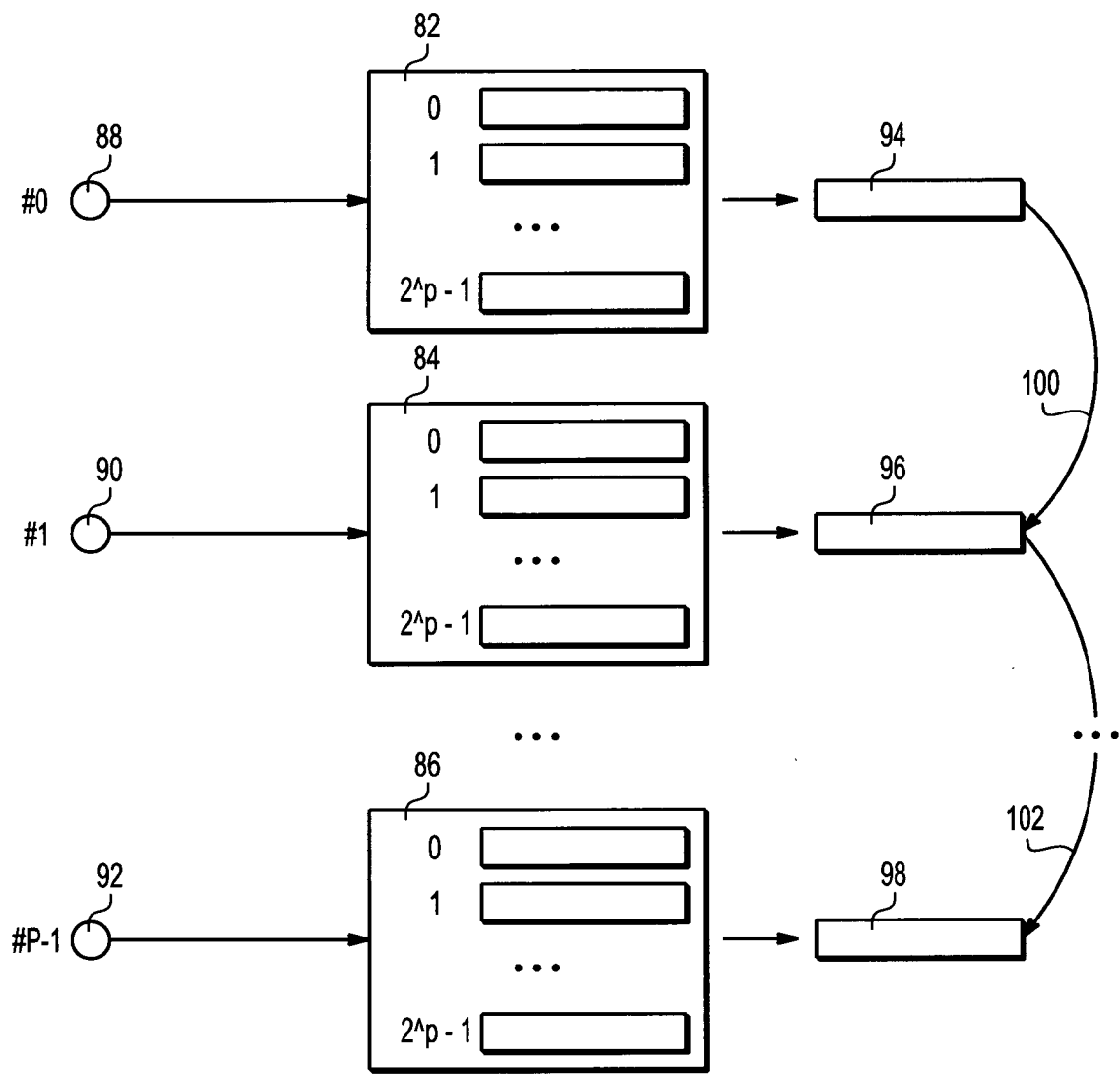
FIG. 7 schematically shows an example of an operation of an embodiment of a system for filtering received data units.

Referring to FIG. 7, an example of an operation of an embodiment of a system for filtering received data units is shown. P Memory blocks may hold P tables 82, 84, 86, each having filter-keys of for example N key-bits size, one key-bit for each of N filters. The memory blocks may for example be part of a memory chip. Each memory block may be connected to a memory location 88, 90, 92, which may be separate from or located within the memory chip holding one or more of the memory blocks. Each memory location 88, 90, 92 may hold one of the data-pieces, i.e. a piece, e.g. a byte, of the split data unit currently being processed. Register-like memory locations 94, 96, 98 may be connected to receive the filter-keys selected when using the data-pieces as indices for the tables 82, 84, 86. A bitwise AND-operation 100, 102 may be performed on the selected filter-keys, either sequentially, as shown here or for example in parallel. After performing the AND-operation, bits having a logical level "1" may indicate the filters which let pass the data unit.

Tables may contain different numbers of filter-key entries, depending on the chosen scheme for splitting the data units and configuration-values into pieces.

In an embodiment of the system each of the pluralities of P configuration-pieces and data-pieces may comprise the same amount of bits. Each piece may comprise the same equal number of bits, for example byte size, in order to allow for better parallelization and therefore even more speeding up the processing.

And P may for example be a power of two and may therefore allow usage of standard registers and processing architecture.

As shown in FIG. 7, each table may for example comprise indexes 0 to $2^P-1$, when p=N/P.

The speed of filtering may decrease with P while the memory requirement M in bits may follow the formula M=P* (2^(SD/P))*N bits with SD being the size of a data unit in bits, P being the number of data-pieces, N being the number of filters. This may allow to estimate the variations with P of the memory requirement and the system performance.

Referring back to FIG. 1, the system may comprise an input 34 configured to receive the filter configuration values supplied by a user of the system. This may allow to adjust the filtering depending on the needs of the user. However, in an alternative embodiment the system may be adapted to use a pre-configured memory structure.

In any case, since the processing may be performed at least partly in parallel e.g. for different data-pieces, the system may for example comprise more than one processing elements adapted to access more than one table and read filter-keys simultaneously. It may for example comprise two or P processing elements.

The shown system may be any kind of system where data filtering or classification is required. For example, the system may be a networking system for packet classification. The system can be used to perform packet filtering/classification. For example concepts like rule set and action set may be implemented efficiently: Actual rules being set up as filters may be ordered by priority and whenever fields in a packet pass the filters (see the AND operations on filtering keys) information is available about which filters/rules apply to the packet (the "0" and "1" results of the AND, i.e. the content of the pass-indication key) and because they are ordered actions which have to be taken they may be easily identified. This may for example allow for greater data rates for applications such as firewalls and routing.

Figure 8:
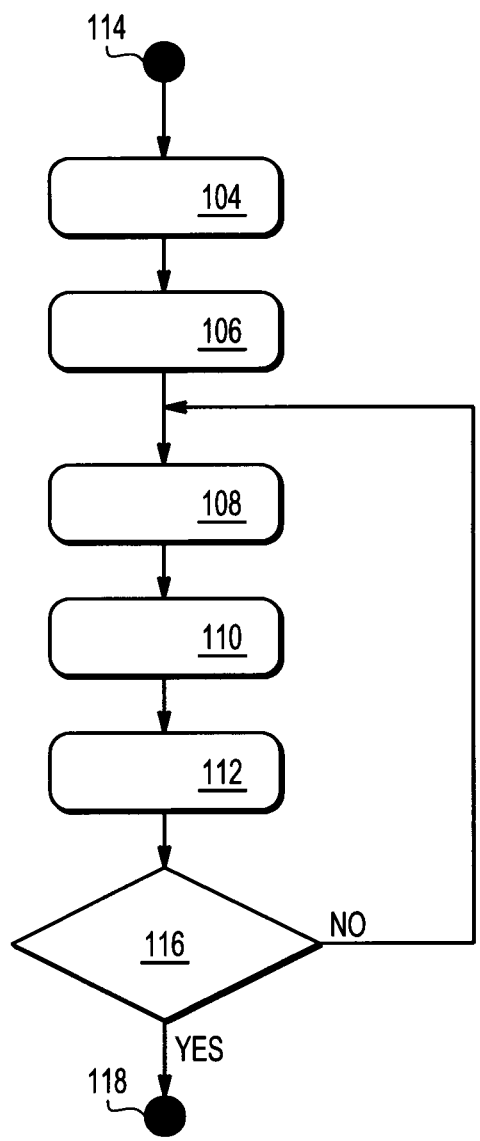
FIG. 8 shows a first schematic flow diagram of an example of an embodiment of a method for filtering received data units.

Referring now to FIG. 8, a first schematic flow diagram of an example of an embodiment of a method for filtering received data units is shown. The illustrated method allows implementing the advantages and characteristics of the described system for filtering received data units as part of a method. The method may begin 114 with empty filter-key tables. The method for filtering received data units on a system having a memory structure adapted to store a plurality of P tables, each table comprising a plurality of filter-keys and corresponding indices, each filter-key comprising one or more key-bits each corresponding to a filter configurable by a corresponding filter configuration value and at least one connected processing element, may comprise receiving 104 one or more filter configuration values; splitting 106 each of the one or more filter configuration values into P corresponding configuration-pieces, each of the P configuration-pieces having a number of bits and corresponding to one of the P tables; for each of the P configuration-pieces of each of the filter configuration values selecting the corresponding configuration-piece 108, selecting 110 the table corresponding to the configuration-piece and using a value of the configuration-piece as a first index for identifying a corresponding key-bit to be modified; and setting 112 the corresponding key-bit. This may be repeated, if a check whether or not each of the P configuration-pieces of each of the filter configuration values have been processed 116 indicates that the digesting is not finished. Otherwise all filter configuration values have been digested 118 and the filters are inserted in the memory structure.

In an embodiment of the method, the receiving one or more filter configuration values 104 may comprise receiving a corresponding filter mask for at least one of the filters; the splitting 106 each of the one or more filter configuration values into P corresponding configuration-pieces may comprise splitting the corresponding filter mask into P corresponding mask-pieces; and the selecting 108 the corresponding configuration-piece and selecting 110 the table corresponding to the configuration-piece and use a value of the configuration-piece as a first index for identifying a corresponding key-bit to be modified may comprise selecting the corresponding mask-piece and identifying each allowed bit combination for the masked configuration piece when generating configuration-pieces and using them as a first index for setting corresponding key-bits in the corresponding table. This may allow for example the use of ternary filtering.

And in an embodiment of the method, the receiving 104 one or more filter configuration values may comprise receiving for at least one of the one or more filter configuration values one or more super-filter configuration values; the splitting 106 each of the one or more filter configuration values into P corresponding configuration-pieces may comprise splitting the corresponding super-filter configuration values into P corresponding super filter configuration-pieces; and the selecting 108 the corresponding configuration-piece and selecting 110 the table corresponding to the configuration-piece and using a value of the configuration-piece as a first index for identifying a corresponding key-bit to be modified may comprise selecting the corresponding one or more super-filter configuration-pieces and identifying each one or more super-filter key-bits depending on the corresponding super-filter configuration value in addition to the key-bits depending on the filter configuration value for the same filter. This may allow for example the digesting of super-filters.

Figure 9:
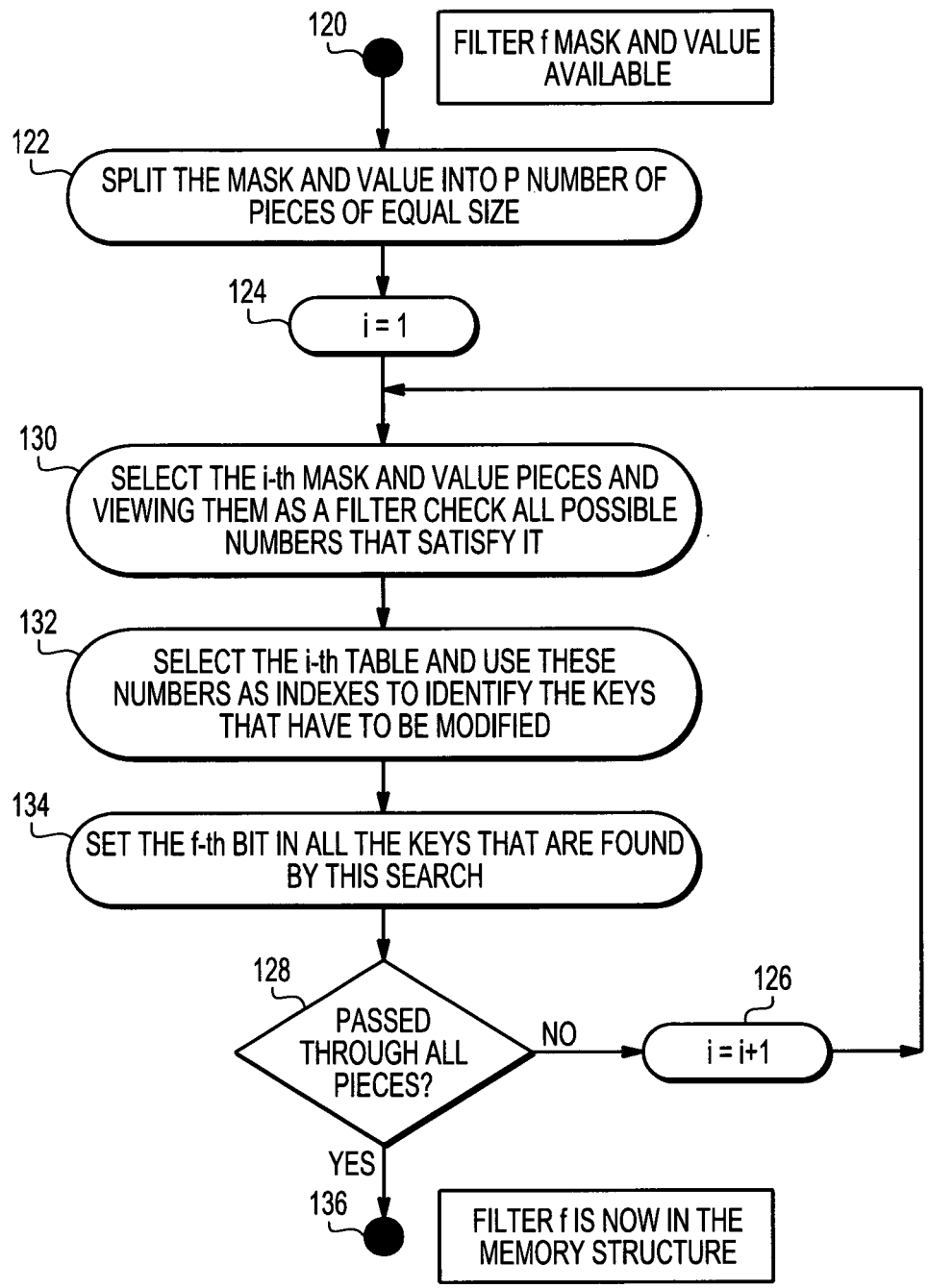
FIG. 9 shows a second schematic flow diagram of an example of an embodiment of a method for filtering received data units.

Referring to FIG. 9, a second schematic flow diagram of an example of an embodiment of a method for filtering received data units is illustrated. In this embodiment of the method, a particular filter f having a value or filter configuration value and a mask may be digested. It starts with mask and value for filter f being available 120. then the mask and value may be split into P number of pieces or configuration-pieces of for example equal size 122. Then for example a piece counter I may be initialized 124 and the following processing steps may be applied to all pieces and the piece conter may be incremented 126 as long as a check whether or not all pieces have been processed 128 indicates that there are configuration-pieces left for digesting. For each i-th piece, the method may include selecting 130 the i-th mask and value pieces or configuration-pieces and viewing them as a filter checking all possible numbers that satisfy it. In a next step 132, the i-th table is selected and these numbers are used as indexes to identify the filter-keys to be modified. In a next step 134, the f-th bitin all filter-keys that are found by the search are set. When all pieces have been digested, filter f may be in the memory structure 136.

Figure 10:
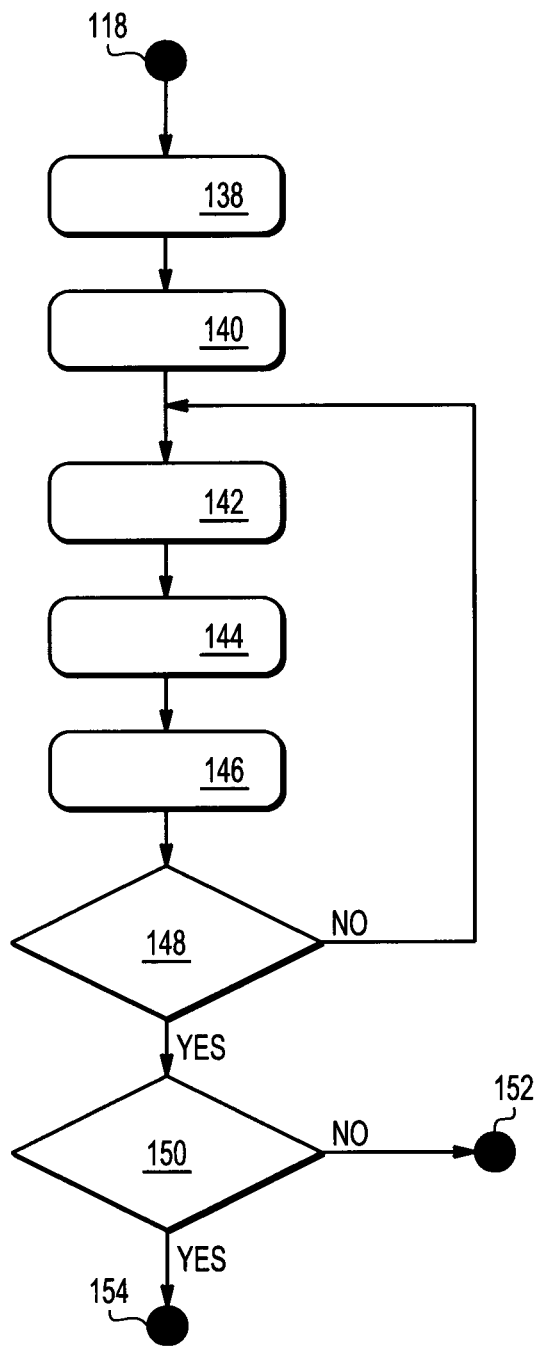
FIG. 10 shows a third schematic flow diagram of an example of an embodiment of a method for filtering received data units.

Referring to FIG. 10 and FIG. 8, a third schematic flow diagram of an example of an embodiment of a method for filtering received data units is shown. The method may for example start with all filter configuration values digested 118 and the filters inserted in the memory structure. The method may comprise receiving 138 at least one data unit; splitting 140 the data unit into P data-pieces having the numbers of bits, for each data-piece using 142 the data-piece as a second index for reading the corresponding filter-key from the corresponding table, loading 144 the corresponding filter-key and updating 146 a pass-indication key for the data unit from a bitwise logical conjunction between the corresponding filter-key and the pass-indication key. Steps 142, 144 and 146 may be repeated until a check, whether or not all data-pieces have been processed 148 indicates an end of the piece-processing for the current data unit. An evaluation whether or not the generated pass-indication key 150 contains only "0" bits may be used for classifying the data unit as either not passed 152, when the pass indication key comprises only "0 bits" or passed 154 otherwise.

Figure 11:
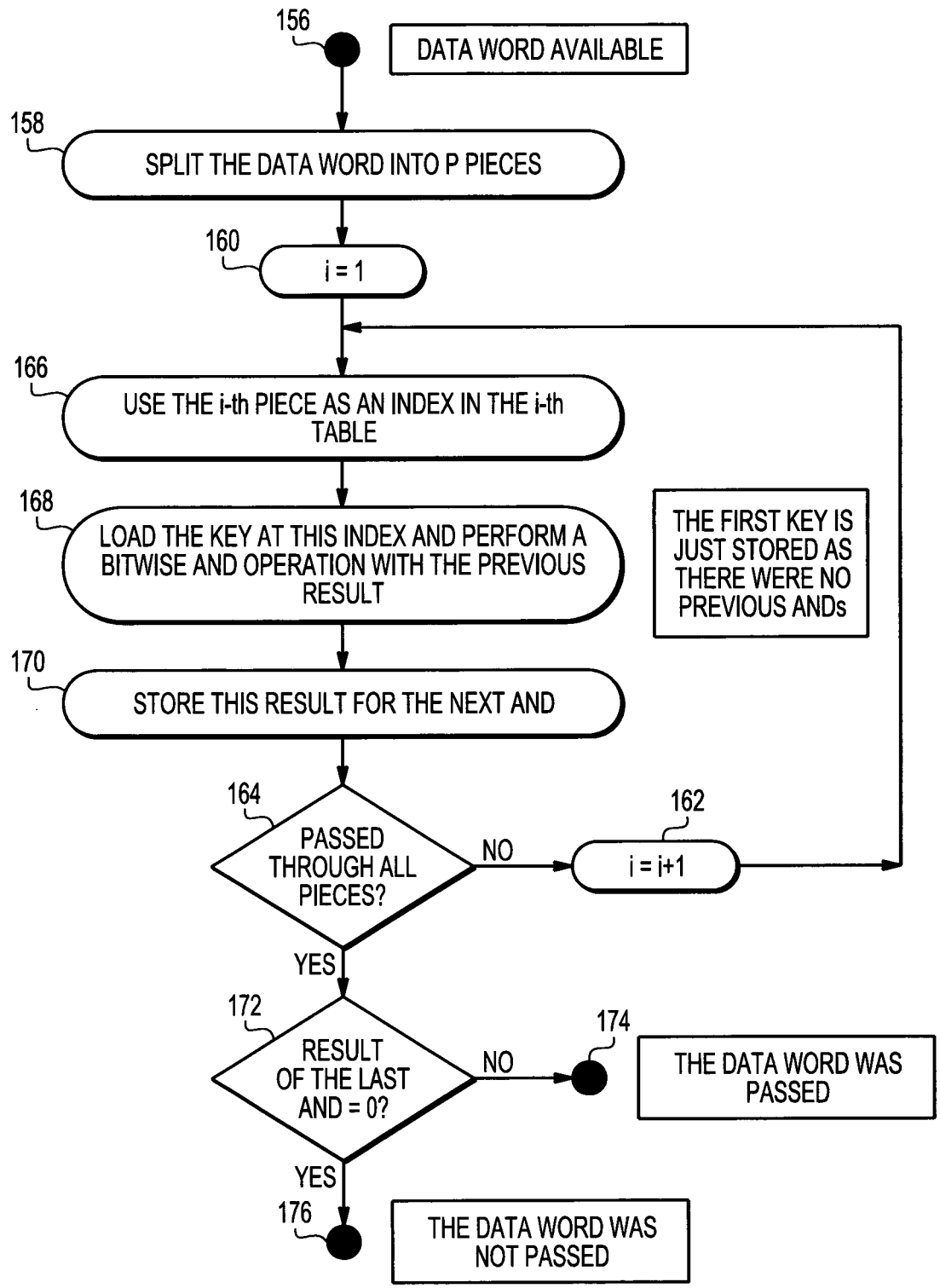
FIG. 11 shows a fourth schematic flow diagram of an example of an embodiment of a method for filtering received data units.

Referring to FIG. 11, a fourth schematic flow diagram of an example of an embodiment of a method for filtering received data units is shown. The method shows an embodiment of the method wherein a data unit is a data word. In step 156 the data word may be received and available for filtering. The data word may then be split 158 into P data-pieces or pieces and a piece-counter counting data-pieces from 1 to P may be initialized 160. The i-th data-piece may be processed as described below an the processing may be repeated for all pieces, therefore the piece-counter may be incremented 162 when a check whether or not all data-pieces have been processed 164 indicates that there are still data-pieces left for filter processing. The filter processing may comprise using 166 the i-th piece as an index in the i-th table, loading 168 the filter-key at this index and performing a bitwise AND operation with the previous result (the first filter-key may just be stored as there are no previous results of an AND operation) and storing 170 this result for the next AND operation. After passing through all the data pieces 164, a check may be performed whether or not the result of the last and, i.e. the pass-indication key comprises only "0" bits 172. If yes, the data word was not passed 176, since none of the filters used let pass the data word. Otherwise the data word was passed 174.

The embodiments of the method for filtering received data units as shown in FIGS. 8, 9, 10, and 11 may allow for a filtering process of one data word which takes a fixed amount of time for a fixed number of configured filters regardless of their complexity: It may perform the same actions regardless of the types of filters supplied. It may only depend on the number of filters, because bigger keys have to be loaded when more filters are used.

As an example, steps taken to filter one data word are shown below. In this example, there are 32 filters, the processing element may be a central processing unit (CPU) configured to load within one CPU cycle 32 bits as one filtering key or filter-key from the memory structure. And the data word may fit in a register:

Step 1:
load address A (address to be filtered) from memory—1 cycle
get 1st piece of A into a register Rp (temporary register)—2 cycles
load 1st table base address from memory—1 cycle
compute an offset in this table using the value from the Rp—1 cycle
add this offset to the base address—1 cycle
load the key from this address and keep it into register Rk—1 cycle Step 2:
get 2nd piece of A into Rp—2 cycles
load the 2nd table base address from memory—1 cycle
compute the offset in the table using the value from Rp—1 cycle
add this offset the base address—1 cycle
load the key from this address—1 cycle
AND this key with the last key in Rk, keep result in Rk—1 cycle Step 2 may then be repeated until all pieces are processed. It can be seen that it may always take the same amount of cycles. Two more cycles may be added to account for acting on the result (like branching, returns, etc.). The total cycle count using general operations (no architecture specific) may therefore be 7*P+2 cycles, i.e. 30 cycles for P=4. Architecture specific optimizations may even allow for reducing the cycle count to for example 14 or lower.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

A computer program product may comprise code portions for executing steps of a method as described above when run on a programmable apparatus.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections.

For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the processing element 22 may be implemented as a plurality of processing elements, for example one comprising the digesting module 24 and one comprising the filtering module 26.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the memory blocks of the memory structure 12 holding the tables 14, 16, 18 may be implemented within the same memory device. Alternatively, the examples may be implemented as any number of separate integrated circuits or separate devices interconnected with each other in a suitable manner. For example, tables 14, 16, 18 may be comprised in memory blocks being part of separate memory devices.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While the principles of the invention have been described above in connection with specific apparatus, it is to be clearly understood that this description is made only by way of example and not as a limitation on the scope of the invention.

The invention claimed is:

1. A method for filtering received data units on a system having a memory structure adapted to store a plurality of P tables, each table comprising a plurality of filter-keys and corresponding indices, each filter-key comprising one or more key-bits each corresponding to a filter configurable by a corresponding filter configuration value and at least one connected processing element, comprising:
   receiving one or more filter configuration values;
   splitting each of said one or more filter configuration values into P corresponding configuration-pieces, each of said P configuration-pieces having a number of bits and corresponding to one of said P tables; and
   for each of said P configuration-pieces of each of said filter configuration values,
     selecting said corresponding configuration-piece,
     selecting said table corresponding to said configuration-piece and using a value of said configuration-piece as a first index for identifying a corresponding key-bit to be modified, and
     setting said corresponding key-bit.

2. The method as claimed in claim 1 wherein
   said receiving one or more filter configuration values comprises receiving a corresponding filter mask for at least one of said filters;
   said splitting each of said one or more filter configuration values into P corresponding configuration-pieces comprises splitting said corresponding filter mask into P corresponding mask-pieces; and
   said selecting said corresponding configuration-piece and selecting said table corresponding to said configuration-piece and using said value of said configuration-piece as said first index for identifying said corresponding key-bit to be modified comprises selecting said corresponding mask-piece and identifying each allowed bit combination for said masked configuration piece when generating said configuration-pieces and using each of said configuration-pieces as said first index for setting corresponding key-bits in said corresponding table.

3. The method as claimed in claim 1 wherein:
said receiving one or more filter configuration values comprises receiving for at least one of said one or more filter configuration values and one or more super-filter configuration values;
said splitting each of said one or more filter configuration values into P corresponding configuration-pieces comprises splitting said corresponding super-filter configuration values into P corresponding super filter configuration-pieces; and
said selecting said corresponding configuration-piece and selecting said table corresponding to said configuration-piece and using said value of said configuration-piece as said first index for identifying said corresponding key-bit to be modified comprises selecting said corresponding one or more super-filter configuration-pieces and identifying each one or more super-filter key-bits, wherein the identifying said one or more super-filter key-bits depends on said corresponding super-filter configuration value in addition to said key-bits depending on said filter configuration value for the same filter.

4. The method as claimed in claim 1, comprising
receiving at least one data unit;
splitting said data unit into P data-pieces having said numbers of bits,
for each data-piece
using said data-piece as said second index for reading said corresponding filter-key from said corresponding table,
loading said corresponding filter-key and
updating a pass-indication key for said data unit from a bitwise logical conjunction between said corresponding filter-key and said pass-indication key.

5. The method as claimed in claim 2 wherein:
said receiving one or more filter configuration values comprises receiving for at least one of said one or more filter configuration values one or more superfilter configuration values;
said splitting each of said one or more filter configuration values into P corresponding configuration-pieces comprises splitting said corresponding superfilter configuration values into P corresponding super filter configuration-pieces; and
said selecting said corresponding configuration-piece and selecting said table corresponding to said configuration-piece and using said value of said configuration-piece as said first index for identifying said corresponding key-bit to be modified comprises selecting said corresponding one or more super-filter configuration-pieces and identifying each one or more super-filter key-bits depending on said corresponding super-filter configuration value in addition to said key-bits depending on said filter configuration value for the same filter.

6. The method as claimed in claim 2, comprising:
receiving at least one data unit;
splitting said data unit into P data-pieces having said numbers of bits,
for each data-piece
using said data-piece as said second index for reading said corresponding filter-key from said corresponding table, loading said corresponding filter-key, and
updating a pass-indication key for said data unit from a bitwise logical conjunction between said corresponding filter-key and said pass-indication key.

7. A system for filtering received data units, comprising:
a memory structure adapted to store a plurality of P tables, each table comprising a plurality of filter-keys and corresponding indices, each filter-key comprising one or more key-bits each corresponding to a filter configurable by a corresponding filter configuration value; and
at least one processing element connected to said memory structure and comprising:
a digesting module adapted to generate said one or more key-bits of each of said filter-keys of said tables by splitting said corresponding filter configuration value into P configuration-pieces each having a number of bits, and to use each configuration-piece as a first index for setting a corresponding key-bit in said corresponding table; and
a filtering module adapted to receive and split said data units into P data-pieces each having said number of bits, for each data-piece use said data-piece as a second index for reading said corresponding filter-key from said corresponding table, and generate a pass-indication key from a bitwise logical conjunction between said read filter-keys, wherein the at least one processing element comprising the digesting module and the filtering module is embodied in a circuit.

8. The system as claimed in claim 7 wherein at least one of said filters is a ternary filter configurable using said corresponding filter configuration value and a mask adapted to mask selected bits of said filter configuration value.

9. The system as claimed in claim 8 wherein said digesting module is adapted to use each allowed bit combination for said masked filter configuration value when generating said configuration-pieces and using each of said configuration-pieces as said first index for setting said corresponding key-bit in said corresponding table.

10. The system as claimed in claim 7 wherein said digesting module is adapted to set one or more super-filter key-bits depending on a corresponding super-filter configuration value in addition to said key-bits depending on said filter configuration value for the same filter.

11. The system as claimed in claim 7 adapted to pass said received data unit when said pass-indication key comprises at least one set bit.

12. The system as claimed in claim 7 wherein said each of said pluralities of P configuration-pieces and data-pieces comprise the same amount of bits.

13. The system as claimed in claim 7 wherein P is a power of two.

14. The system as claimed claim 7 comprising an input configured to receive said filter configuration values supplied by a user of the system.

15. The system as claimed in claim 7 comprising more than one processing elements adapted to access more than one tables and read filter-keys simultaneously.

16. The system as claimed in claim 7 wherein said system is a networking system for packet classification.

17. The system as claimed in claim 8 wherein said digesting module is adapted to set one or more super-filter key-bits depending on a corresponding super-filter configuration value in addition to said key-bits depending on said filter configuration value for the same filter.

18. The system as claimed in claim 8 adapted to pass said received data unit when said pass-indication key comprises at least one set bit.

19. The system as claimed in claim 8 wherein said each of said pluralities of P configuration-pieces and data-pieces comprise the same amount of bits.

20. A computer program product embodied as a non-transitory computer readable medium storing code portions for executing steps of a method as claimed in claim 1 when run on a programmable apparatus.

\* \* \* \* \*